UNITED STATES PATENT OFFICE.

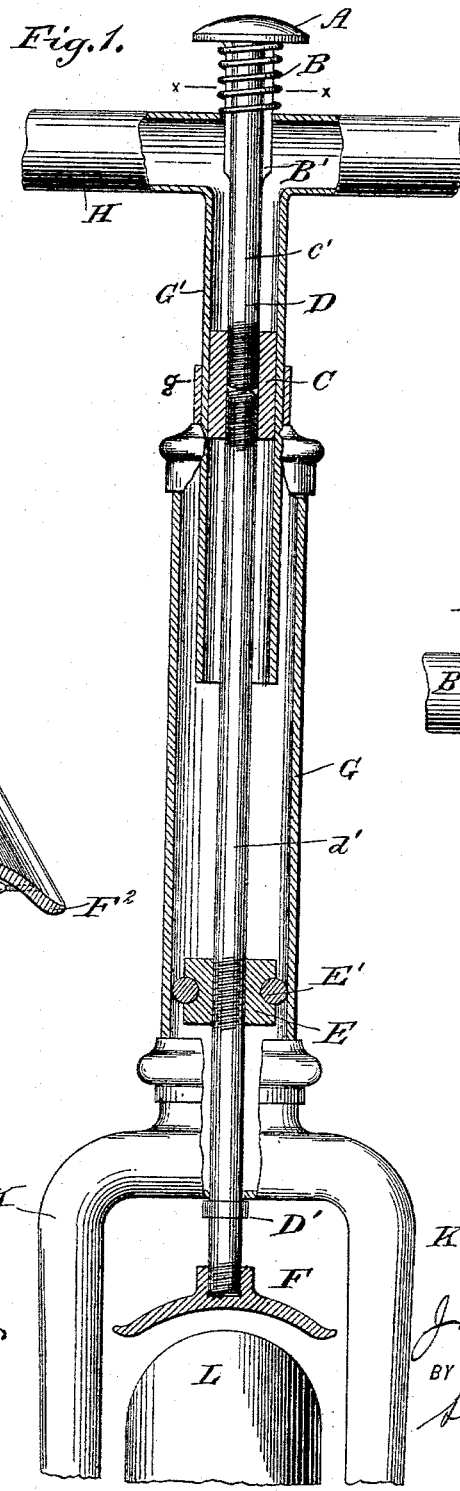

JOSEPH MURPHY, JR., OF NEW YORK, N. Y.

BICYCLE-BRAKE.

SPECIFICATION forming part of Letters Patent No. 583,921, dated June 8, 1897.

Application filed April 18, 1896. Serial No. 588,077. (No model.)

*To all whom it may concern:*

Be it known that I, JOSEPH MURPHY, Jr., a citizen of the United States, residing at the city of New York, county and State of New York, have invented a new and useful Improvement in Bicycle-Brakes, of which the following is a specification, reference being had to the accompanying drawings, in which like letters refer to like parts in each figure thereof.

My invention relates to improvements in bicycle-brakes; and its object is to provide a simple and efficacious brake of light weight and having a neat appearance, the unsightly parts thereof being inclosed within the tubing of the bicycle and concealed from view. This arrangement also renders the brake less liable to injury by accident.

In the drawings, Figure 1 shows the steering-head in section and the brake in position in the head. Fig. 2 is a top view of the handle-bar, showing brake-bar in cross-section on a line of $x\,x$ of Fig. 1. Fig. 3 is a view of the brake-shoe with rollers.

A is the hand-plate, where pressure is exerted upon the brake-rod.

B is a coiled spring strung on the brake-rod. This spring is preferably in position above the handle-bar H, but as its function is to assist in the operation of the brake-rod in its vertical movement it may be located at any point on said rod where it will perform its function.

D is the brake-rod.

E and C are collars. C is used as a coupler for the parts of the brake-rod, while E is adapted to carry the gasket E'. These are threaded on the inside.

$c'$ and $d'$ are sections of the brake-rod D.

F is the brake-shoe, and D' is a collar confining the upward movement of the rod $d$.

G is the outer tube of the frame-post.

G' is the shank of the handle-bar of the frame-post.

$g$ is a clutch to secure the position of the tubes forming the frame-post when in position.

H is the handle-bar.

K are the forks of the frame.

L is the tire of the bicycle.

Fig. 2, which shows a top view of the frame-post G, also shows in the same a cross-section of the brake-rod D. It will be seen that at this point, which is a view on the lines $x\,x$ of Fig. 1, the brake-rod is provided with wing-flanges B', which are adapted to be adjusted in the slots $h$, provided for them in the head of the shank of the handle-bar H.

The brake-rod D is made in sections and screw-tapped into the couplings E. By this means the brake-rod may be lengthened or shortened to suit the raising or lowering of the handle-bar.

The collar E is threaded upon the lower part of the brake-rod and has an annular groove in its periphery, which is utilized for the purpose of lodging the gasket E'. This gasket is intended to fit snugly in the tube G' and prevent the rod D from having any lateral motion. Different-sized gaskets may be used according to the diameter of the tubing in which the brake-rod is inclosed.

The shoe F is curved in form, so as to conform to the shape of the tire. It may be provided with rollers F', as shown in Fig. 3. This form is best for light bicycles, as the first strain of the pressure on the brake-shoe would be received by the roller. These rollers are preferably made elliptical in shape and are so journaled on the shoe that the outer boundary $F^2$ of the shoe proper, when the pressure is increased, will come in contact with and clutch the tire, thus giving a rolling brake at first and a rigid one afterward. The rollers are placed so that they are at right angles to the tire and the bottom of the rollers are above the outside edges of the shoe. The shoe is made of a piece of metal convexo-concave in shape and preferably of tempered steel, so that when firmly pressed over the tire it will expand to some extent on its edges.

The operation of this brake is as follows: When the rider desires to stop, a hand is pressed on the button A. This depresses the brake-rod, collapses the coiled spring, and causes the shoe to engage with the elastic tire of the bicycle. If a roller-shoe is used, the roller is the first part of the shoe that forms a contact and a rolling pressure is induced. A still greater pressure on the button A causes the edges of the shoe F to come in contact with and expand over the tire, and a still greater pressure on A forces these edges down, clutching the tire and retarding the revolution of the wheel. This pressure also causes the rollers to come in contact with the under side of the brake-shoe, thus confining their revolution and causing a greater friction on the tire. If the plain shoe is used, the pressure induced on A is at once communicated to the tire through the rod D, and a perfect stop may be effected more quickly than it would be if rollers were used.

Having thus described my invention, what I claim as new, and desire to secure by Letters Patent, is—

In a bicycle-brake the combination of a brake-rod and means for operating the same and a concave shoe constructed of spring metal having elliptical rollers journaled therein.

JOSEPH MURPHY, JR.

Witnesses:
S. J. COX, Jr.,
FRANK M. SENIOR.